United States Patent [19]
Frenker-Hackfort

[11] Patent Number: 5,249,415
[45] Date of Patent: Oct. 5, 1993

[54] LINK CHAIN, IN PARTICULAR A FLYER CHAIN.

[75] Inventor: Ludger Frenker-Hackfort, Kirchen-Heckersdorf, Fed. Rep. of Germany

[73] Assignee: Rexnord Kette GmbH & Co. KG, Betzdorf, Fed. Rep. of Germany

[21] Appl. No.: 680,343

[22] Filed: Apr. 4, 1991

[30] Foreign Application Priority Data

May 31, 1990 [DE] Fed. Rep. of Germany ... 9006153[U]

[51] Int. Cl.⁵ .............................................. F16G 13/08
[52] U.S. Cl. ...................................... 59/78.1; 59/93; 59/84
[58] Field of Search ............ 59/78, 78.1, 84, 93, 59/91, 35.1, 5; 474/226, 207

[56] References Cited

U.S. PATENT DOCUMENTS

| | | | |
|---|---|---|---|
| 3,584,922 | 6/1971 | Koerner | 59/5 |
| 3,779,003 | 12/1973 | Boissevain et al. | 59/78.1 |
| 4,114,467 | 9/1978 | Petershack | 198/851 |
| 4,186,553 | 2/1980 | Fitchett | 59/78.1 |
| 4,533,343 | 8/1985 | Kobiella | 474/207 |
| 4,747,261 | 5/1988 | Frenker-Hackfort | 59/78 |
| 4,852,342 | 8/1989 | Hart | 59/78.1 |

FOREIGN PATENT DOCUMENTS

| | | | |
|---|---|---|---|
| 527096 | 10/1921 | France | 59/5 |
| 1298216 | 5/1962 | France | 59/5 |
| 0045087 | 4/1977 | Japan | 59/5 |

*Primary Examiner*—David Jones
*Attorney, Agent, or Firm*—Akoo-Toren

[57] ABSTRACT

A link chain, in particular a flyer chain, comprising plate-like chain links joined together by means of link pins has protective surfaces of non-metallic covers extending over the width of the outer surface of the chain links.

3 Claims, 1 Drawing Sheet

LINK CHAIN, IN PARTICULAR A FLYER CHAIN.

TECHNICAL FIELD OF THE INVENTION

The invention relates to a link chain, in particular a flyer chain, comprising plate-like chain links joined together by means of link pins.

BACKGROUND OF THE INVENTION AND PRIOR ART

Flyer chains of this kind, which are chiefly used as load chains in fork-lift trucks, are known having any desired combination and number of chain link plates per chain link. In a flyer chain disclosed in German Offenlegungsschrift 3 402 102 links consisting of plastics material are integrated as a separate component between the link plates of the chain links. On one side, transverse to the longitudinal axis of the link pin, these plastic links have exposed surfaces projecting relative to the chain links. As a result, during the unavoidable swinging or tilting of the chain it is not the chain links but the link plates of plastics material projecting relative to them that strike against the piston rod of a hydraulic cylinder. This is because the lifting fork of a fork-lift truck is adjusted by means of a hydraulic cylinder which reversibly loads the driving chain, formed as a flyer chain, which is guided over deflection rollers. The protective link plates with their exposed surfaces projecting transversely to the longitudinal axis of the link pins ensure that even a chain that is greatly tilted or twisted still strikes the neighbouring component to be protected, such as the piston rod of a hydraulic cylinder, with a link plate of plastics material. However, with this known flyer chain, damage to the supply lines which slide over the chain, such as in particular hydraulic hoses, cannot be prevented, as they rub and wear against the metallic outer surfaces of the chain links that face them.

OBJECT OF THE INVENTION

It is an object of the invention to provide a link chain, in particular a flyer chain, of the kind mentioned in the introduction with which the supply lines which come into contact with the chain can be protected.

SUMMARY OF THE INVENTION

To this end, according to the invention protective surfaces of non-metallic covers extend over the width of the outer surface of the chain link. The surface of the chain facing the supply hoses, remote from the chain wheel/deflection roller, is thus completely shielded on the outside; the supply hoses slide solely over the covers made of plastics material, for example of an impact-resistant material such as polyacetal or low pressure polyethylene, or covers of hard rubber. Friction and wear of the supply hose or hoses owing to contact with a metallic surface is thus prevented.

In the case of T-shaped covers inserted with their stem webs between the link plates of the chain links, the flanges of the T-pieces—which may be of different lengths—extend in the direction of the longitudinal axis of the link pins over the width of the chain links.

Alternatively U-shaped covers whose flanges overlap the outer link plates of the chain links, or L-shaped covers of which one limb bears against the outer link plates of the chain links while the other limb overlaps the outer surface of the chain links, may be provided. Like the link plates of the chain links, the covers are provided with through-bores and are arranged on the link pins.

If at least the corners of the protective surfaces are rounded, sharp edges on the sliding surfaces for the supply hoses can be avoided.

The outer sides of the protective surfaces can be concave in the transverse direction in order to centre the supply hoses.

The outer sides of the protective surfaces can have a convex profile in the longitudinal direction. The contour of the protective surfaces which thus gradually rises and falls again in the direction of movement of the chain causes the supply hoses to be lifted and thereby benefits the run-in and run-out conditions of the supply hose lying on or separating from the chain.

BRIEF DESCRIPTION OF THE DRAWINGS

The invention will now be described in more detail with reference to some exemplary embodiments shown in the drawings, in which.

DETAILED DESCRIPTION OF PREFERRED EMBODIMENTS OF THE INVENTION

Figure 1:
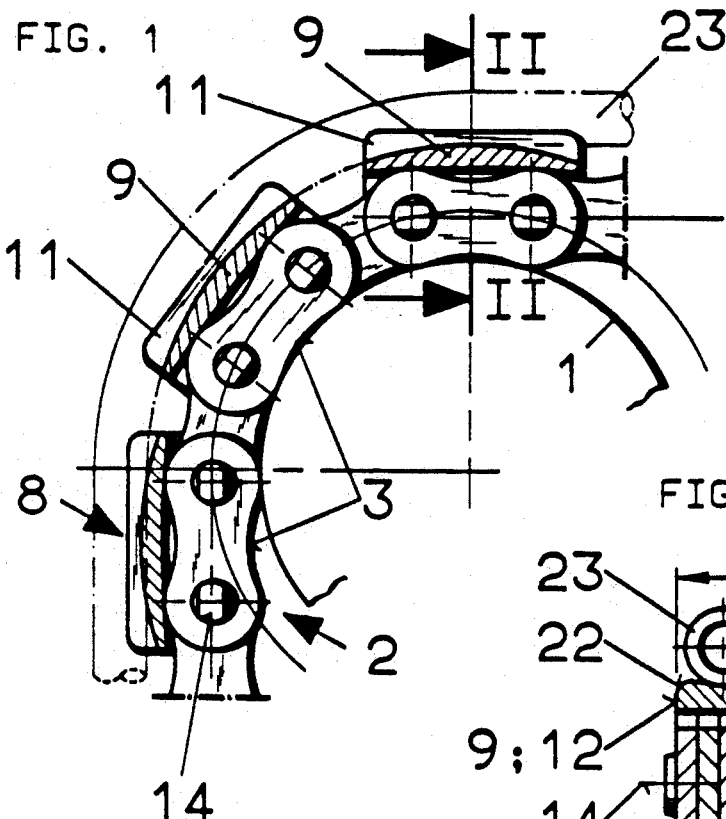
FIG. 1 shows, in longitudinal section, a chain link of a link chain in the region of a deflection roller having the covers according to the invention.

The flyer chain 2 that is guided over a deflection roller 1 comprises chain links 3, of which only three are shown in FIG. 1. Each chain link 3 consists of outer link plates 4 and intermediate link plates 5 which are joined together in an articulated manner by means of link pins 6, in particular rivet pins (cf. FIG. 2).

Figure 3:
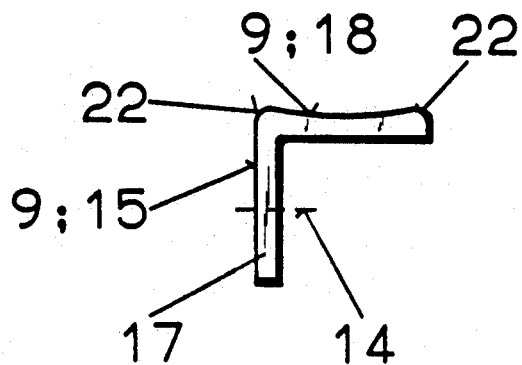
FIG. 3 shows an L-shaped cover according to the invention.
Figure 4:
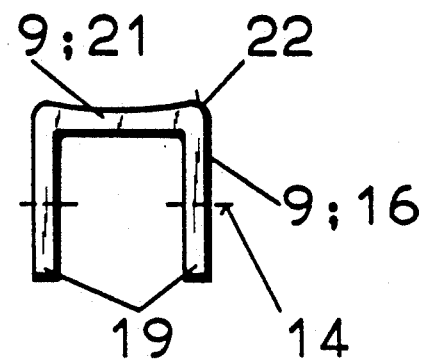
FIG. 4 shows a U-shaped cover according to the invention.

Protective surfaces 9 of non-metallic covers 11 extend over the width 7 of the outer surfaces 8 of the chain links 3 remote from the deflection roller 1. In the embodiment shown in FIGS. 1 and 2 the covers 11 are formed as T-shaped pieces 12 of which the stems 13, like the link plates 4, 5, are provided with through-bores 14 for insertion of the fastening link pins 6 and are inserted between the intermediate link plates 5 of the chain links 3. Alternatively the covers 11 can be L-shaped pieces 15 or U-shaped pieces 16 as shown in FIGS. 3 and 4. In the case of L-shaped pieces 15 inserted in the chain one limb 17 overlaps an outer link plate 4 of the chain link 3 of the flyer chain 2 while the other limb 18 forms the protective surface 9 covering the chain link 3 over its width 7. The flanges 19 of the U-shaped pieces 16 placed over the chain links 3 overlap the two outer link plates 4, and the cross-piece 21 forms the protective surface 9 covering the outer surface 8 of the chain link 3.

Figure 2:
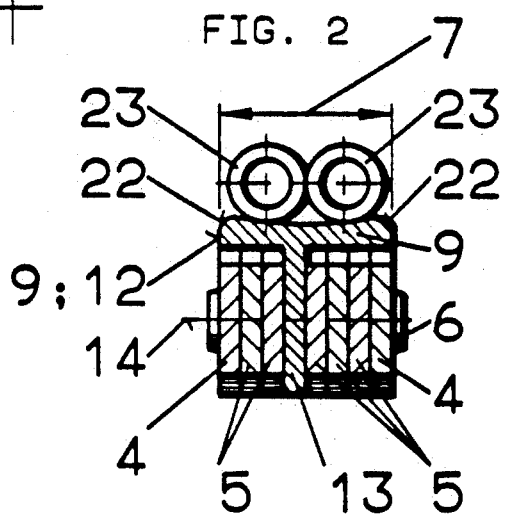
FIG. 2 shows a cross-section through the link chain along the line II—II in FIG. 1.

The corners 22 of the protective surfaces 9 of the covers 11 are rounded and the outer sides are concave in the transverse direction, i.e. viewed over the width of the chain link 3, so that supply hoses 23 sliding over the flyer chain 2 are centred there (cf. FIG. 2). As shown in FIG. 1, the outer sides 24 of the protective surfaces 9 facing the supply hoses 23 are convex in the longitudinal direction, i.e. in the direction of movement of the flyer chain 2; this outwardly curved contour causes the supply hoses 23 to be lifted and thus assist their movement over the flyer chain 2 and their separation from the flyer chain at the turning points. While they are in contact with the flyer chain 2, however, the supply hoses 23 always lie on non-metallic covers 11 so that as they slide over the flyer chain 2 they are protected from damage due to friction.

What is claimed is:

1. A flyer chain, guidable over a roller and comprising:
   plate-like chain links, each having outer link plates and intermediate link plates, the chain links being joined together by means of link pins, each of said chain links having an outer surface remote from the roller, and said outer surface having a width; and
   a plurality of non-metallic covers provided so that each cover of said plurality of covers extends over the entire width of the outer surface of one of the chain links, so as to form protective surfaces for the links, said covers being U-shaped and having flanges overlapping the outer link plates of the chain links.

2. A flyer chain, guidable over a roller and comprising:
   plate-like chain links, each having outer link plates and intermediate link plates, the chain links being joined together by means of link pins, each of said chain links having an outer surface remote from the roller, and said outer surface having a width; and
   a plurality of non-metallic covers provided so that each cover of said plurality of covers extends over the entire width of the outer surface of one of the chain links, so as to form protective surfaces for the links, said covers being L-shaped and having one limb bearing against the outer link plates of the chain links while an outer limb overlaps the outer surface of the chain links.

3. A flyer chain, guidable over a roller and comprising:
   plate-like chain links, each having outer link plates and intermediate link plates, the chain links being joined together by means of link pins, each of said chain links having an outer surface remote from the roller, and said outer surface having a width; and
   a plurality of non-metallic covers provided so that each cover of said plurality of covers extends over the entire width of the outer surface of one of the chain links, so as to form protective surfaces for the links, said protective surfaces having outer sides that are concave in a transverse direction.

* * * * *